United States Patent
Masiuk

(10) Patent No.: US 7,679,332 B2
(45) Date of Patent: Mar. 16, 2010

(54) DELAY TIME CONTROL CIRCUIT IN A BATTERY PROTECTOR TO REDUCE DELAY TIME

(75) Inventor: Siarhei Masiuk, Minsk (BY)

(73) Assignee: Neotec Semiconductor Ltd., Hsinchu County (TW)

( * ) Notice: Subject to any disclaimer, the term of this patent is extended or adjusted under 35 U.S.C. 154(b) by 437 days.

(21) Appl. No.: 11/767,507

(22) Filed: Jun. 23, 2007

(65) Prior Publication Data

US 2008/0316665 A1    Dec. 25, 2008

(51) Int. Cl.
*H01M 10/46* (2006.01)
(52) U.S. Cl. ........................................ 320/134
(58) Field of Classification Search ............ 320/107, 320/112, 130, 134, 136; 324/426, 430, 433
See application file for complete search history.

(56) References Cited

U.S. PATENT DOCUMENTS 5,768,290 A * 6/1998 Akamatsu .............. 714/732
6,427,222 B1 * 7/2002 Shau .......................... 716/4
6,489,819 B1 * 12/2002 Kono et al. .............. 327/141

* cited by examiner

*Primary Examiner*—Edward Tso
(74) *Attorney, Agent, or Firm*—Huntington IP Consulting Co., Ltd

(57) ABSTRACT

A battery protection IC using charging control pin, Cout, so as to reduce delay time during CP test or FT test for is disclosed. The battery protection IC has a delay time control circuit including a comparator and a delay signal selector. The comparator has a negative input terminal connected to VCC, a positive input terminal connected with the Cout pin and an output terminal connected to the delay signal selector. To perform foregoing test, a voltage source is added to activate the short delay time mode rather than a normal delay time one.

8 Claims, 3 Drawing Sheets

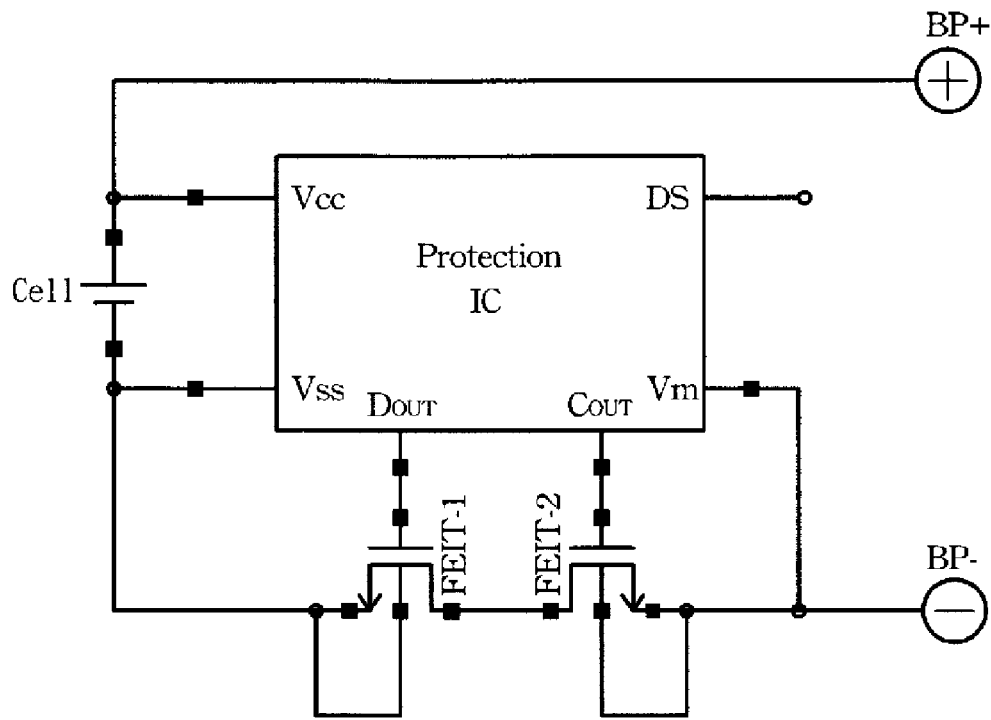
F I G. 1
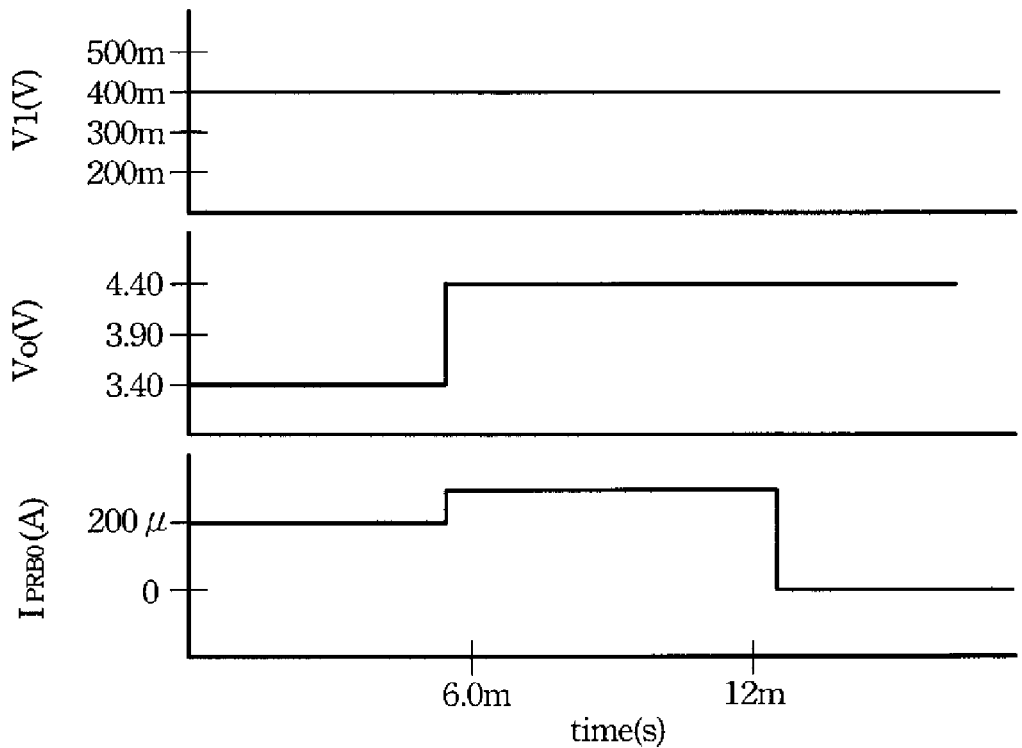
F I G. 4

DELAY TIME CONTROL CIRCUIT IN A BATTERY PROTECTOR TO REDUCE DELAY TIME

FIELD OF THE INVENTION

The present invention pertains to a delay time control circuit, particularly to a battery protection integrate circuit embedded with a delay time control circuit therein so that the testing time can be massively reduced while performing testing procedures.

BACKGROUND OF THE INVENTION

For protection a very popular but unfortunately expensive lithium-ion/lithium-polymer rechargeable battery against over-discharge and over-current occurrence, battery and battery protector or say battery protection IC (integrated circuit) are commonly embedded into a battery pack. For malfunction such as noise issue elimination, a generally strategy for battery producer is to combine a battery protector with an internal delay circuit therein. Typically, the delay time for over-charge condition varies in a range between about 0.1-2.0 seconds.

However, to set up the parameter for overcharge condition during the testing phase, a lot of test times to find out the value are usually demanded. As a result, the total time cost is significantly increased and inferior to do tests for protection IC mass production. Furthermore, a popular protection IC is, as shown in FIG. 1, including five external pins, VCC, VSS, DOUT, COUT, Vm and an additional testing pad DS to reduce the delay time while performing wafer level test, as called CP test, for the overcharge condition search. Hence, to do a final test (FT; packed IC), it is necessary to bring the test pad out of the protection IC package according to conventional method.

An object of the present invention is to disclose a delay time control circuit for battery protection IC by using charging control pin Cout to do FT test and wafer level test without using an extra testing pad or DS pin.

Another object of the present invention is to reduce the testing time.

SUMMARY OF THE INVENTION

An object of the present is to disclose a delay time control circuit embedded into the battery protection IC so as to reduce delay time spending while performing CP test or FT test for battery protection IC.

According to the present invention, a control pin Cout is used to reduce the delay time, no additional testing pad is required. The battery protection IC has a delay time control circuit including a comparator and a delay signal selector. The comparator has a negative input terminal connected to VCC, a positive input terminal connected with the Cout pin and an output terminal connected to the delay signal selector. To perform foregoing test, a voltage source is added to activate the delay control circuit, which outputs a delay time reduce signal rather than a normal delay time signal thereafter. By means of a current probe to detect the change of the current flowing through, the overcharge condition of the battery protection IC can be detected.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein:

FIG. 1 is a conventional battery protection IC having an additional DS pin to reduce the delay time.

FIG. 4 showing timing diagram in according to the present invention.

DETAILED DESCRIPTION OF THE PREFERRED EMBODIMENT

As foregoing descriptions in the background of the invention, to do conventional test for obtaining some crucial parameters exist following problems: (1) For wafer level test (CP test) an additional testing pad DS attached on the protection IC is necessary or for final test (FT test) a package DS pin is required; (2) It about 1.2 s time per test is required. But for completing the test for a battery protection IC many times of testing are necessary. Thus to do the tests for massive number of protection ICs is a time lengthy process. The present invention is to disclose apparatus for CP test or FT test for battery protection IC to reduce the testing time massively, and more importantly, the testing can be implemented by means of the package pin Cout without any extra testing pad or package pad.

The principle of the Cout can be used for testing is based on the fact that the working voltage range for Cout is from VCC (power voltage of the protection IC) to (VCC$-$($V_{charger}$)$_{max}$), where ($V_{charger}$)$=V_{BP+}-V_{BP-}$. Therefore $V_{Cout}$>VCC never happens. Consequently, a voltage VCC+$\Delta$V exerted on the Cout pin can be used to initialize a delay time reduction circuit.

The battery protection IC according to the present invention has a delay time control circuit embedded in the protection IC circuit. To do the testing function, it only requires an extra voltage source, a current meter (probe) or a voltage meter connected to the battery protection IC. To do normal function, the battery protection IC according to the present invention is the same as conventional one. It does not affected by the delay time control circuit.

Figure 2:
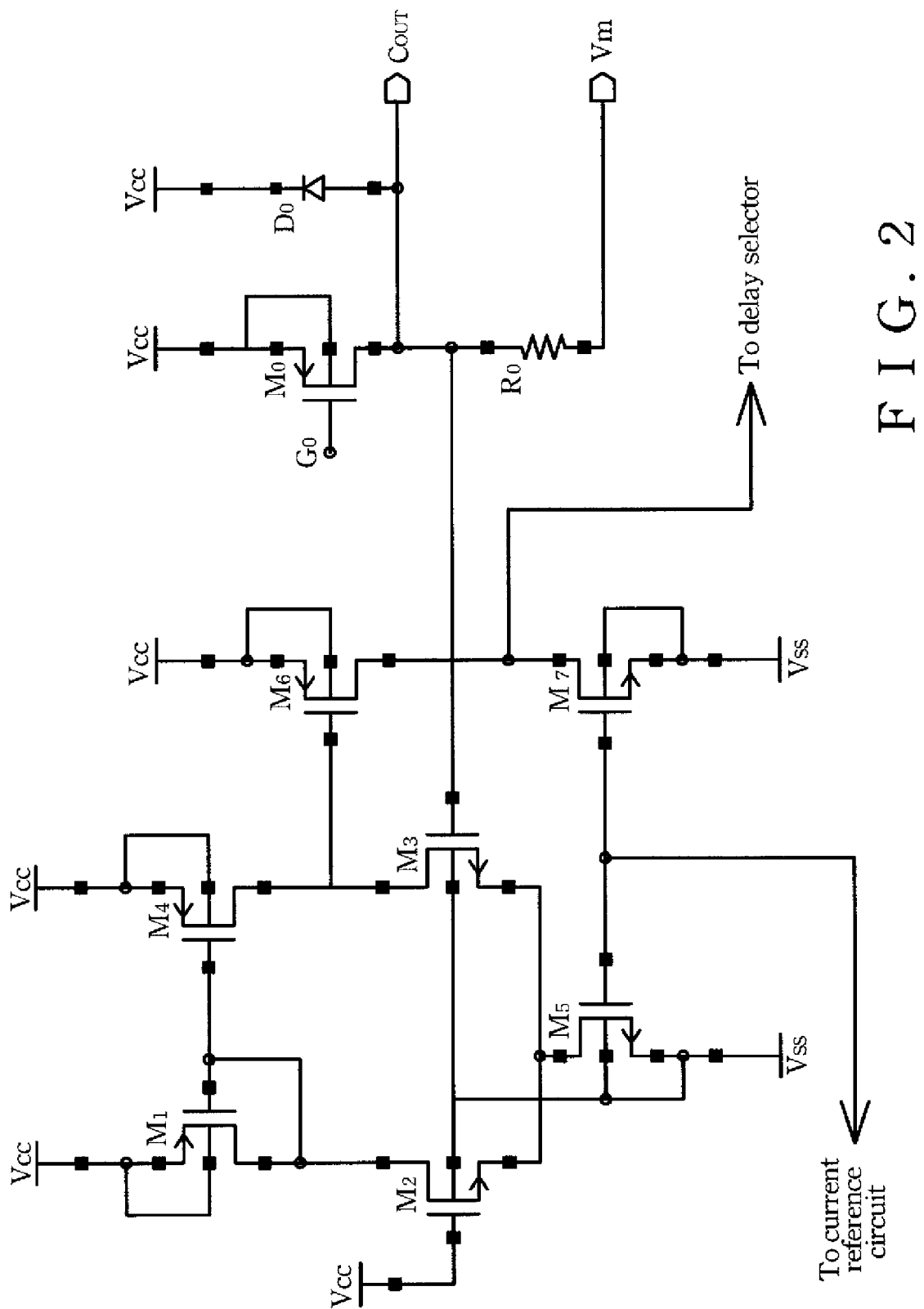
FIG. 2 is a configuration of a comparator embedded in the battery protection IC according to the present invention.
Figure 3:
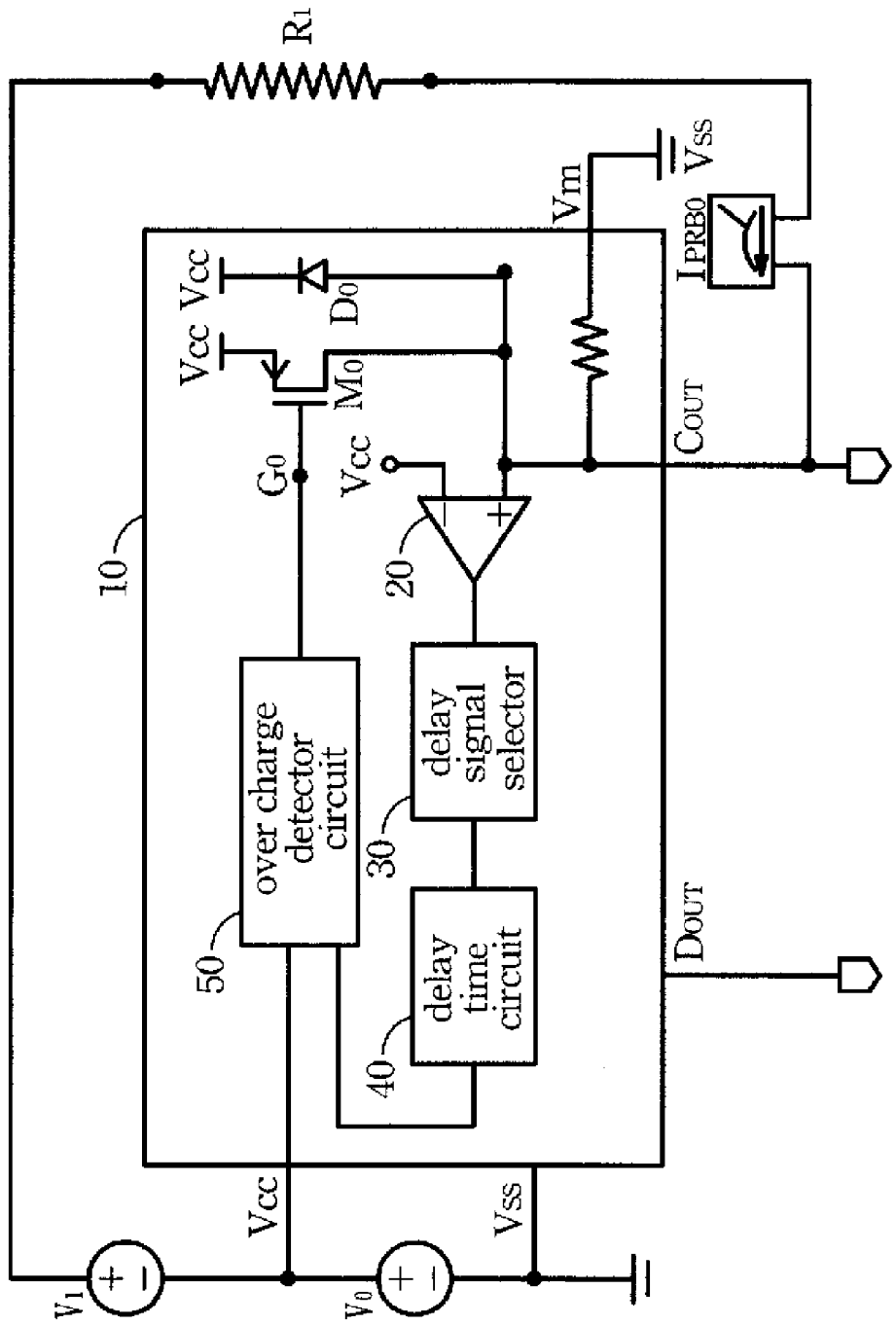
FIG. 3 is a battery protection IC having delay time control circuit connected with a voltage source to activate the delay time control circuit in according to the present invention.

According to a preferred embodiment of the present invention, the delay time control circuit includes delay signal selector 30 and a comparator 20, please refer to FIG. 3. The comparator 20 can be any conventional type. An example is shown in FIG. 2, which shows an asymmetric comparator 20 composed of transistors M1 to M7. In the circuit, the diode D0 between pin Cout and VCC is a parasitic diode and the transistor M0 is a control transistor controlled by a control signal G0.

As the battery is charging, the signal G0 turns on the transistor M0 (e.g. for PMOS the signal G0 is low) so the voltage of $C_{OUT}$=VCC till the battery overcharge condition is detected. In the latter situation the signal G0 turns off the transistor M0. In the asymmetric comparator, the transistors M2, M3 is an asymmetric differential pair controls a $\Delta$V voltage level and can be calculated as $$\Delta V = \sqrt{\frac{2Id}{\mu Cox}}\left(\sqrt{\frac{L2}{W2}} - \sqrt{\frac{L3}{W3}}\right).$$

Where Id: is drain current; $\mu$: mobility of charge carriers; Cox: gate oxide capacitance per unit area; L2, W2: are, respectively, channel length and width of the transistor M2; L3, W3: are, respectively, channel length and width of the transistor M3.

As the pin Cout is used for testing, the embedded delay time control circuit is to be initialized by the ΔV, at which the delay time is desired to be shrunk to a value about 5-10 ms.

The apparatus provided for performing the FT or CP test comprises a protection IC 10, a voltage source V1 to produce ΔV, a voltage source V0, a resistor R1, and current meter Iprob0 in accordance with a preferred embodiment, as is shown in FIG. 3. The current meter is an optional and can be replaced by a voltage meter since both current meter (current probe) or voltage meter is used merely to monitor the current flowing through the resistor R1, or Cout pin, or the voltage drop cross the two terminal of the resistor R1.

Still referring to FIG. 3, the voltage source V0, the voltage source V1, the resistor R1 are in series connected to the Cout pin. Furthermore, the battery cell voltage source V0 with a negative and a positive electrode connected in between the VSS pin and VCC pin. The protection IC 10 comprises a delay time circuit 40, a control transistor M0, a parasitic diode D0, an overcharge detector circuit 50 and the delay time control circuit having the comparator 20 and a delay time signal selector 30.

The comparator 20 has a negative input terminal connected to a power voltage VCC, a positive input terminal connected with the Cout pin, and an output terminal connected to the delay signal selector 30. The output of the delay signal selector 30 is connected to a delay time circuit 40. The delay time circuit 40 permits the overcharge detector circuit 50 to output a control signal G0 to the control transistor M0.

The operations of performing CP test or FT test with a reduced time cost are as follows:

The voltage source V1 is an adjustable voltage source to activate the delay time control circuit and can be set between about 0.1 to 0.6V. The V1 level should be lower than 0.6V is to avoid turning on the parasitic diode D0 but at least larger than 0.1 V. Too small the V1 may have a risk of wrong operation caused by noise.

In the normal application circuit the voltage source V1 equals to zero. In this case pin COUT has a voltage VCC-Vsd, where Vsd is source-drain voltage of M0. So, it is always lower than VCC, thus the comparator 20 outputs a negative power voltage to the delay signal selector 30 to choose a normal delay time signal.

Please refer to FIG. 4 simultaneously. At the initial time, the battery cell voltage source V0 is lower than overcharge level.

At the next, the cell voltage source V0 is changed from low to a critical condition, for example, overcharge, $V_{overcharge}$. The voltage of the pin COUT has a voltage (V0+V1−I1*R1) that is higher than VCC. The comparator 20 outputs a positive power voltage to the delay signal selector 30 to choose a short delay time signal, which passes through the delay time control 40 to the overcharge detector circuit 50 outputs a signal G0 to turn OFF the transistor M0.

Since the comparator 20 has a very high input resistance (e.g. an infinite for an ideal comparator), and thus when the transistor M0 is turned off, the current $I_{PROB0}$ is reduced to zero. Consequently, we can know the battery cell voltage V0 reaching an overcharge condition within a very short time per test.

As the pin Cout is used in normal, that is either to turn on the n-type field transistor FET-2 while charging the battery or to turn off FET-2 while overcharge occurs, the external devices such as voltage source V1, current meter IPRB0 (or voltage meter), resistor R1 are removed. The embedded reduce delay time control circuit should not affect the battery protection IC. To achieve this object, the ΔV should be less than the built-in voltage of the diode D0, i.e. ΔV<0.6V. In this situation the delay time is a normal and equals about 1.2 second.

In the normal use, the comparator 20, the delay signal selector 30 within the protection IC 10 will not affect the delay time circuit 40 since the comparator 20 always outputs a negative power voltage to select a normal delay time as a conventional battery protection IC.

The delay time control circuit can also be redesigned for PMOS configuration of protection IC. In that case the Cout pin will have a negative control voltage ΔV.

The benefits of the present invention:
(1) The CP test and FT test for the battery protection IC can be implemented without any extra pin or pad.
(2) The time loss for foregoing CP test or FT test can be reduced significantly.
(3) The comparator does not need to be a high grade one, since the ΔV can have a range between 0.1 V to 0.6V. Once the protection IC having the delay time control circuit is made, an appropriate ΔV selected can be obtained by the external voltage source V1 adjustment.

What is claimed is:

1. A battery protection IC using charging control pin, Cout, to reduce delay time while performing CP test or FT test, is comprising:

a delay time control circuit having a comparator and a delay signal selector therein, said comparator having a negative input terminal connected to VCC, a positive input terminal connected with said Cout pin and an output terminal connected to said delay signal selector; and a voltage source connected to said Cout pin so as to activate said delay time control circuit to reduce overcharge delay time while performing said CP test or FT test.

2. The battery protection IC according to claim 1 wherein said voltage source is adjustable so as to selected a value between about 0.1V to 0.6V.

3. The battery protection IC according to claim 2 wherein said voltage source selected depends on said comparator.

4. The battery protection IC according to claim 1 further comprises a current probe to detect the current change flowing through said Cout pin.

5. Apparatus having a delay time control circuit in battery protection IC provided for performing FT test or CP test, comprises:

a resistor;

a first voltage source;

a battery cell voltage source;

a battery protection IC having five pins of VCC, VSS, Vm, Cout, and Dout, a comparator, a delay signal selector, a delay time circuit, an overcharge detector circuit, a control transistor, said comparator having a negative input terminal connected to VCC, a positive input terminal connected with said Cout pin and an output terminal connected to said delay signal selector, said delay signal selector outputs a testing delay signal to said delay time circuit, which permits said overcharge detector circuit to control said control transistor; and said first voltage source and said resistor are connected in series with said Cout pin and further said cell voltage source with a negative and a positive electrode connected in between said VSS pin and said VCC pin, said first voltage source being provided an adjustable voltage.

6. The apparatus according to claim 5 further comprises a current meter in series connected to said resistor or a voltage meter cross said resistor to monitor a current following through or a voltage drop so as to judge if said battery cell voltage source is overcharged or not.

7. The apparatus according to claim 5 wherein said first voltage source is to provide a voltage between about 0.1 V to 0.6V.

8. The apparatus according to claim 7 wherein said first voltage source selected depends on said comparator.

* * * * *